United States Patent [19]

Dixon

[11] Patent Number: 4,784,031

[45] Date of Patent: Nov. 15, 1988

[54] REPLACEMENT CHEEKSTRIP APPARATUS FOR USE WITH CUTTING CYLINDER KNIVES

[76] Inventor: Richard W. Dixon, 12424 Dewey Rd., Wheaton, Md. 20906

[21] Appl. No.: 180,630

[22] Filed: Apr. 6, 1988

Related U.S. Application Data

[63] Continuation of Ser. No. 4,422, Jan. 20, 1987, abandoned.

[51] Int. Cl.[4] .............................................. B23D 25/12

[52] U.S. Cl. ........................................ 83/117; 83/139; 83/142; 83/346; 101/117; 101/224

[58] Field of Search ................. 83/346, 138, 143, 139, 83/142, 116, 117; 101/DIG. 19, 117, 224, 226

[56] References Cited

U.S. PATENT DOCUMENTS

| | | | |
|---|---|---|---|
| Re. 17,892 | 10/1930 | Wood | 83/347 |
| 422,576 | 3/1890 | Eager | 83/142 |
| 928,256 | 7/1909 | Grissom | 83/142 |
| 1,082,986 | 2/1913 | Wilder | 83/139 |
| 1,766,807 | 8/1930 | Wood | 83/347 |
| 1,937,519 | 7/1933 | Lamatsch | 164/66 |
| 1,986,457 | 9/1935 | Wood | 164/66 |
| 2,038,336 | 1/1936 | Bachmann | 164/66 |
| 2,368,571 | 9/1945 | Sabo | 12/17 |
| 2,403,035 | 7/1946 | Whitson | 83/142 |
| 3,269,238 | 8/1966 | Whistler, Sr. et al. | 83/139 |
| 4,499,802 | 2/1985 | Simpson | 83/139 |
| 4,543,862 | 10/1985 | Levene et al. | 83/139 |

FOREIGN PATENT DOCUMENTS

| | | | |
|---|---|---|---|
| 1277043 | 10/1961 | France | 83/139 |
| 1087327 | 10/1967 | United Kingdom | 101/226 |

*Primary Examiner*—Edgar S. Burr
*Assistant Examiner*—James Lisehora
*Attorney, Agent, or Firm*—Shapiro and Shapiro

[57] ABSTRACT

A replacement cheekstrip having an upper part and a lower part for fitting into a knife box assembly that is installed in the rotary cutting cylinder of the folder used on a roll fed printing press. The upper part is made from a hard solid material connected to the lower part which is made from a soft material. The soft material can be open cell sponge rubber. A knife is inserted between the flat surfaces of the replacement cheekstrips. The soft material applies correct tension to the upper part, hard solid material, which in turn contacts the paper, against an adjacent cutting member, and clamps it securely to enable the knife to make a quiet, consistent, distortion free, severance.

2 Claims, 2 Drawing Sheets

REPLACEMENT CHEEKSTRIP APPARATUS FOR USE WITH CUTTING CYLINDER KNIVES

This is a continuation application of Ser. No. 004,422, filed 1/20/87, now abandoned.

BACKGROUND OF THE INVENTION

This invention relates to a replacement cheekstrip apparatus having an upper part made from a hard material such as polyurethane, and having a lower part made from a soft material such as open cell sponge rubber.

DESCRIPTION OF THE PRIOR ART

A cheekwood is used by the printing industry as a paper holding component in a knife box assembly. The knife box assembly is installed in a slot provided in the rotary cutting cylinder, located in the folder of a roll fed printing press. The rotary knife cylinder is designed to cut the paper as it passes, in conjunction with another adjacent cylinder or surface, or abutment, against which the paper is held by the spring pressed cheekwoods in order to clamp and hold it without undue bending, buckling, or distortion, so as to produce a clean and exact severance.

Components of a typical prior art knife box assembly 10 are shown in FIGS. 1 and 2. The knife box assembly comprises two knife box halves 10A and 10B, two cheekwoods 12A and 12B, and a knife 14 fixed between the halves of the knife box. Each half of the knife box comprises a channel 16A or 16B that is defined by a web 18 and a pair of flanges 20 and 22 extending in the same direction from opposite edges of the web. The halves of the knife box are disposed at opposite sides of the knife 14 with corresponding flanges extending toward each other, so as to define a hollow, elongated knife box. Flanges 22 support the base of the knife therebetween, with the knife bisecting the knife box and projecting therefrom through an opening at one side of the knife box between the flanges 20. Each cheekwood has a portion 24 of generally rectangular cross-section within the corresponding channel 16A or 16B and has a portion 26 that projects from the knife box between a flange 20 and the knife 14, as shown in FIG. 2. As is apparent, each cheekwood has a flat face that is juxtaposed with an opposed face of the knife, and each cheekwood rests on a series of coil springs 28 as shown.

In operation, the cheekwoods, in response to pressure applied to portions 26, move inwardly of the knife box so that the tip of the fixed knife 14 is exposed to cut paper as it moves past the knife box assembly.

In the prior art, cheekwoods typically have been made entirely from hard material such as phenolic, and they rest on the springs in the knife box assembly. Alternatively, prior art cheekwoods have been made entirely from a soft material such as sponge rubber, and used in the knife box assembly without springs.

A major problem with prior art cheekwoods is longevity. Printing presses having cheekwoods requiring springs are disabled when springs break. Also, the springs are relatively expensive to replace.

Printing presses using prior art cheekwoods made entirely from sponge rubber have had problems because the sponge rubber does not last very long in a high speed operation. This is due to the lack of durability of using only sponge rubber material.

OBJECTS AND SUMMARY OF THE INVENTION

An object of the present invention is to provide an improved cheekstrip for use in a high speed, roll fed, printing press.

Another object of the present invention is to provide a replacement cheekstrip having a long lasting service life.

A further object of the present invention is to provide a replacement cheekstrip that is inexpensive and will operate on a high speed printing press at any desired speed.

An additional object of the present invention is to provide a replacement cheekstrip that can fit into knife box assemblies without modification of the knife box assemblies, and replace prior art cheekwoods.

In accordance with one aspect of the invention, in a roll-fed printing press knife box assembly that includes a hollow, elongated knife box with an opening at one side thereof through which a knife of the assembly projects, a cheekstrip comprises two elongated strip pieces that are contiguous along their length, one of said pieces being composed of a relatively hard material and the other of said pieces being composed of a relatively soft, resilient material, said one piece including a base portion adjacent to said other piece and a protrusion remote from said other piece, said base portion in combination with said other piece being shaped to occupy substantially the interior of the knife box at one side of the knife and said protrusion being shaped to project from said base portion through the opening of the knife box at said one side of the knife.

BRIEF DESCRIPTION OF THE DRAWINGS

The accompanying drawings, which are incorporated in and constitute a part of this specification, illustrate a preferred embodiment of the invention and, together with the description, serve to explain the principles of the invention.

DETAILED DESCRIPTION OF THE PREFERRED EMBODIMENT

Figure 3:
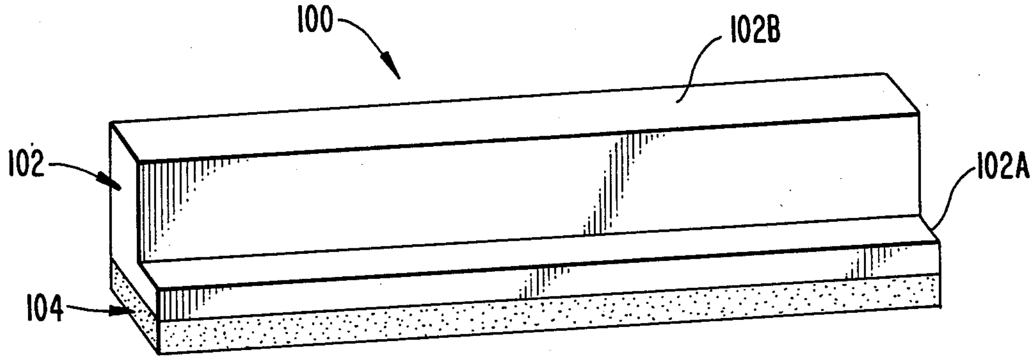
FIG. 3 is a perspective view of a cheekstrip of the invention.

Referring to FIG. 3, a preferred embodiment of a cheekstrip 100 of the invention is shown comprising a first elongated strip piece 102 of a hard solid material contiguous with a second elongated strip piece 104 of a soft material. Typically, the piece 102 is made from a material having the hardness of 90 A polyurethane. The piece 104 is made from a soft material such as open cell sponge rubber, usually neoprene. The piece 102 is connected to the piece 104 along their lengths.

Figure 1:
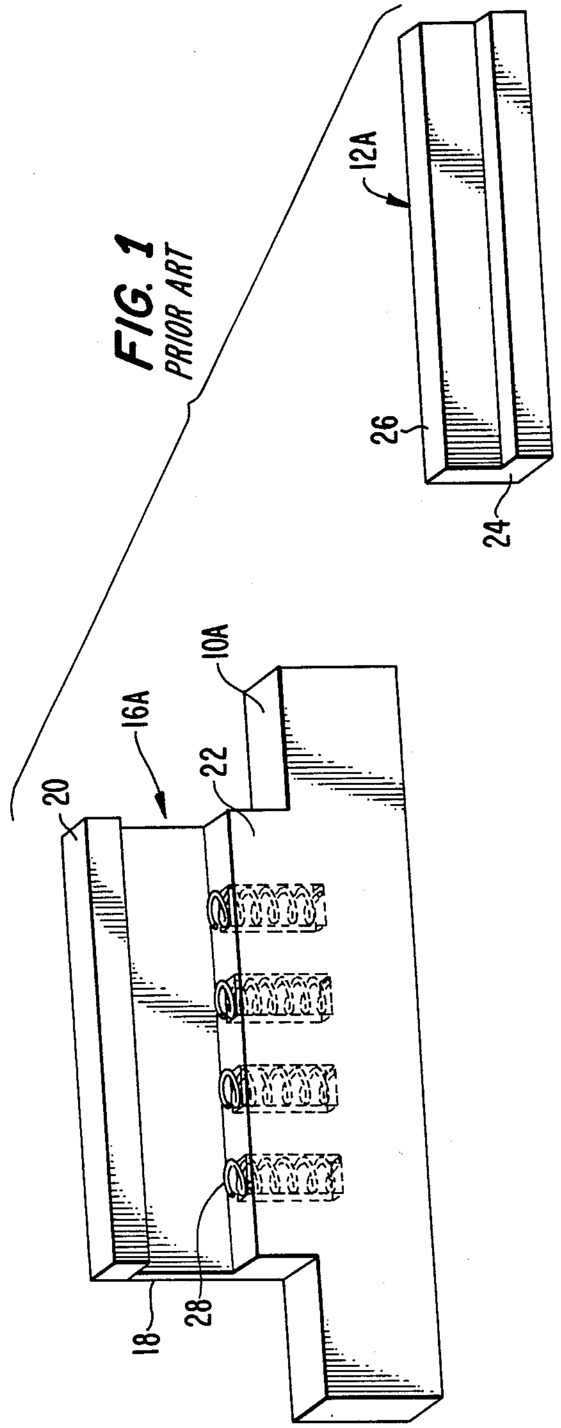
FIG. 1 PRIOR ART
FIG. 1 is a perspective view of one half of a prior art knife box assembly, illustrating springs and a prior art cheekwood.
Figure 2:
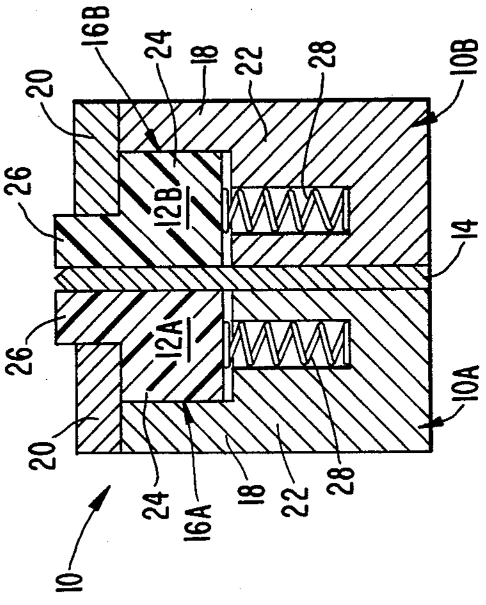
FIG. 2 PRIOR ART
FIG. 2 is a cross-section of a prior art knife box assembly having first and second cheekwoods resting on springs, with a knife inserted therein.
Figure 4:
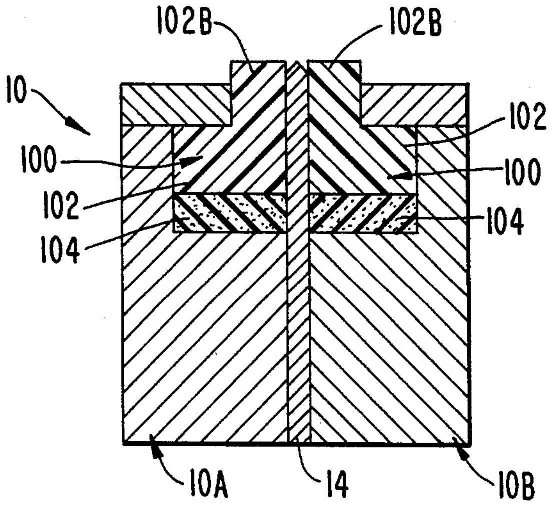
FIG. 4 is a cross-section of a knife box assembly having first and second cheekstrips of the invention with a knife inserted therein.

FIG. 4 shows the two halves 10A and 10B of a knife box assembly 10 clamped or fastened together with the respective flanges of the knife box halves facing each other as in FIG. 2. Two cheekstrips 100 fit into the knife box assembly at opposite sides of knife 14, with a flat face of each piece 102 juxtaposed with an opposed face of the knife, and with the height of the face of piece 102 in a direction extending away from piece 104 being coextensive with a substantial portion of the corresponding height of the opposed face of the knife in the interior of the knife box, as shown in FIG. 4.

As shown in FIG. 3, piece 102 of each cheekstrip includes a base portion 102A adjacent to piece 104 and a protrusion 102B remote from piece 104, the base portion 102A in combination with piece 104 being shaped to occupy substantially the entire interior of the knife box at one side of the knife, as shown in FIG. 4, and the protrusion 102B being shaped to project from the base portion 102A through the opening of the knife box at one side of the knife. The cheekstrips 100 require no springs in the knife box assembly.

In operation, the cheekstrips move in response to pressure applied to protrusions 102B of the cheekstrips, causing the tip of the fixed knife to be exposed and cut paper passing over the knife box assembly. The pieces 102 and 104 of each cheekstrip are connected to each other throughout their length. Piece 102 is preferably bonded to or molded into piece 104.

The shape of the cheekstrips 100 is similar to the cheekwoods used in the prior art. Note, however, that no springs are required in the knife box assembly with the cheekstrips 100 as used in the prior art, since the soft material serves to act as a release allowing the cheekstrips 100 to move in response to pressure being applied thereto.

The cheekstrips 100 as described herein may be used, for example, in web press folder knife boxes and eliminate the need for springs used with prior art cheekwoods and the problems associated therewith.

In practice, the present invention allows replacement cheekstrips to be made at less cost than prior art cheekwoods and springs they replace. Further, since no springs are required, the replacement cheekstrips have the advantages of quiet operation and longer lasting life, than systems having springs which break. Further, the replacement cheekstrips will not tear the web and can be used with any weight, coated or uncoated paper. Additionally, the replacement cheekstrips can operate in a roll fed printing press folder at any speed desired, and since there are no moving springs, this reduces wear on all cutting components.

Additional advantages of the present invention include not having to modify the knife boxes for using the replacement cheekstrips.

From the teachings of the present invention, it will be obvious that variations and extensions can be made from the claimed invention. For example, in a preferred embodiment, the cheekstrips can be used as either one or two units on each side of a knife box assembly, requiring either two or four replacement cheekstrips. Further, the total number of cheekstrips used can be increased in a knife box assembly.

It will be apparent to those skilled in the art that various modifications can be made to the replacement cheekstrip apparatus of the instant invention without departing from the scope or spirit of the invention, and it is intended that the present invention cover modifications and variation of the replacement cheekstrip apparatus provided they come within the scope of the appended claims and their equivalents.

I claim:

1. In a roll-fed printing press, a knife box assembly comprising a hollow, elongated knife box of generally rectangular cross-section and including a pair of channels, each channel having a web and a pair of flanges extending in the same direction from opposite edges of said web, one pair of corresponding flanges of the respective channels extending toward each other and supporting therebetween the base of a knife that bisects the knife box and projects therefrom through an opening between the other pair of corresponding flanges of the respective channels, and a pair of elongated cheekstrips extending longitudinally within the knife box at opposite sides of the knife, each cheekstrip comprising two elongated strip pieces that are contiguous along their length, one of said pieces being disposed adjacent to a flange of said one pair of flanges and the other of said pieces being disposed adjacent to a flange of said other pair of flanges, having a flat face juxtaposed with an opposed face of said knife, with the height of said face of said other piece in a direction extending away from said one piece being coextensive with a substantial portion of the corresponding height of said opposed face of said knife in the interior of said knife box, and having a portion that projects from the knife box through said opening between the last-mentioned flange and the knife, said other piece of said cheekstrip having a base portion adjacent to said one piece that is substantially rectangular in cross-section, said one piece being substantially rectangular in cross-section, said one piece being formed of a relatively soft, resilient sponge rubber material and said other piece being formed of a relatively hard polyurethane material, said two pieces of each cheekstrip being bonded to each other throughout their length, said cheekstrips filling substantially the entire hollow interior of said knife box at opposite sides of the knife.

2. A knife box assembly according to claim 1, wherein said other piece of each cheekstrip is molded onto said one piece of that cheekstrip.

* * * * *